United States Patent
Solomon

(10) Patent No.: US 6,873,948 B1
(45) Date of Patent: Mar. 29, 2005

(54) METHOD AND APPARATUS FOR EMULATING A DEVICE WITHIN A DATA PROCESSING SYSTEM

(75) Inventor: Richard L. Solomon, Colorado Springs, CO (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/082,663

(22) Filed: May 21, 1998

(51) Int. Cl.[7] .......................... G06F 13/00; G06F 9/455
(52) U.S. Cl. ........................................ 703/24; 710/107
(58) Field of Search ............................ 703/20, 24, 25, 703/27; 710/107, 240, 8, 10, 15, 17, 18, 19, 72, 220; 719/321; 395/500.45, 500.46, 500.41, 500.42; 709/1

(56) References Cited

U.S. PATENT DOCUMENTS

| | | | |
|---|---|---|---|
| 3,938,101 A | 2/1976 | Lewis et al. ............. 340/172.5 |
| 4,340,965 A | * 7/1982 | Beckman et al. ........... 714/814 |
| 4,484,266 A | 11/1984 | Becker et al. ............. 364/200 |
| 5,093,776 A | 3/1992 | Morss et al. ................ 395/500 |
| 5,297,067 A | 3/1994 | Blackborrow et al. ...... 364/708 |
| 5,440,697 A | 8/1995 | Boegel et al. .............. 395/500 |
| 5,442,305 A | * 8/1995 | Martin et al. ................. 326/30 |
| 5,499,378 A | 3/1996 | McNeill, Jr. et al. ....... 395/500 |
| 5,548,783 A | 8/1996 | Jones et al. ................. 395/836 |
| 5,590,312 A | 12/1996 | Marisetty .................... 395/500 |
| 5,664,119 A | * 9/1997 | Jeffries et al. .............. 710/103 |
| 5,687,312 A | 11/1997 | Whetsel ................. 395/183.04 |
| 5,717,903 A | * 2/1998 | Bonola .................. 395/500.45 |
| 5,761,033 A | 6/1998 | Wilhelm ..................... 361/686 |
| 5,796,984 A | * 8/1998 | Pearce et al. ................. 703/24 |
| 5,898,861 A | * 4/1999 | Emerson et al. ....... 395/500.44 |
| 5,920,709 A | * 7/1999 | Hartung et al. ............. 710/129 |
| 5,946,469 A | * 8/1999 | Chidester ..................... 710/72 |
| 6,078,742 A | * 6/2000 | Chow ........................... 703/25 |

\* cited by examiner

Primary Examiner—Thai Phan
(74) Attorney, Agent, or Firm—Yee & Associates, P.C.

(57) ABSTRACT

A method and apparatus in a data processing system for mimicking a device attached to a bus. Signaling is detected on the bus indicating a request to access the device. The bus is then monitored for a response by the device. If a selected period of time passes without a response being made by the device, a response suitable to indicate the presence of the device is sent onto the bus.

8 Claims, 5 Drawing Sheets

FIG._1

METHOD AND APPARATUS FOR EMULATING A DEVICE WITHIN A DATA PROCESSING SYSTEM

BACKGROUND OF THE INVENTION

1. Technical Field

An improved data processing system and in particular to a method and apparatus for emulating a device within a data processing system. Still more particularly, the present invention relates to an improved method and apparatus for emulating a device that has been disconnected from the data-processing system.

2. Description of the Related Art

A good server data processing system is dependent on an efficient input/output (I/O) system. After all functional requirements have been defined and all the components specified, a server relies heavily on its storage 10 subsystem. This critical subsystem controls the movement of data between the CPU and peripheral devices. No matter how fast the CPU, a single I/O bottleneck can keep any server from living up to its full performance potential. Therefore, an important aspect of building a better server is building an efficient storage subsystem. Today's servers place an extra demand on storage systems. Faster CPUs require more and more data from the storage system to meet increased data accesses. Multitasking operating systems allow data to be processed by multiple threads. Multimedia applications also heavily tax a server's data transfer ability with huge files. Faced with these facts, a server can no longer perform to its optimum less built with an efficient I/O system. The American National Standards Institute (ANSI) has a standard for defining a standard high-speed parallel interface that is used to provide for then speed in I/O transfers. The standard is referred to as the Small Computer System Interface (SCSI) standard. A SCSI interface is used to connect microcomputers to SCSI peripheral devices, such as many hard disks and printers, and to other computers and local area networks. SCSI provides for a local I/O bus that can be operated over a wide range of data rates. The objective of the SCSI interface is to provide host data processing systems, such as servers, with device independence within the class of devices. Thus, different disk drives, tape drives, printers, optical media drives, and other devices can be added to a computer without requiring modifications to system hardware or software.

The interface protocol includes provision for connection of multiple initiators (SCSI devices capable of initiating an operation) and multiple targets (SCSI devices capable of responding to a request to perform an operation). Distributed arbitration is built into the architecture of SCSI. A priority system awards interface control to the highest priority SCSI device that is contending for use of the bus.

A number of operating systems, such as Unix and OS/2, require that SCSI devices be attached to the data processing system and powered up at boot time. This situation is not generally a problem for permanently attached peripherals, such as disk drives. For devices, such as tape drives or CD-ROM drives, which might be shared among several data processing systems, connecting a device often requires a reboot. Such a situation is disruptive to users of a data processing system and increases the time associated with a device swap. Therefore, it would be advantageous to have a method and apparatus for reducing the time associated with a device swap and to reduce the disruption to users of a data processing system.

SUMMARY OF THE INVENTION

The present invention provides a method and apparatus in a data processing system for mimicing a device attached to a bus. Signaling is detected on the bus indicating a request to access the device. The bus is then monitored for a response by the device. If a selected period of time passes without a response being made by the device, a response suitable to indicate the presence of the device is sent onto the bus.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION

Figure 1:
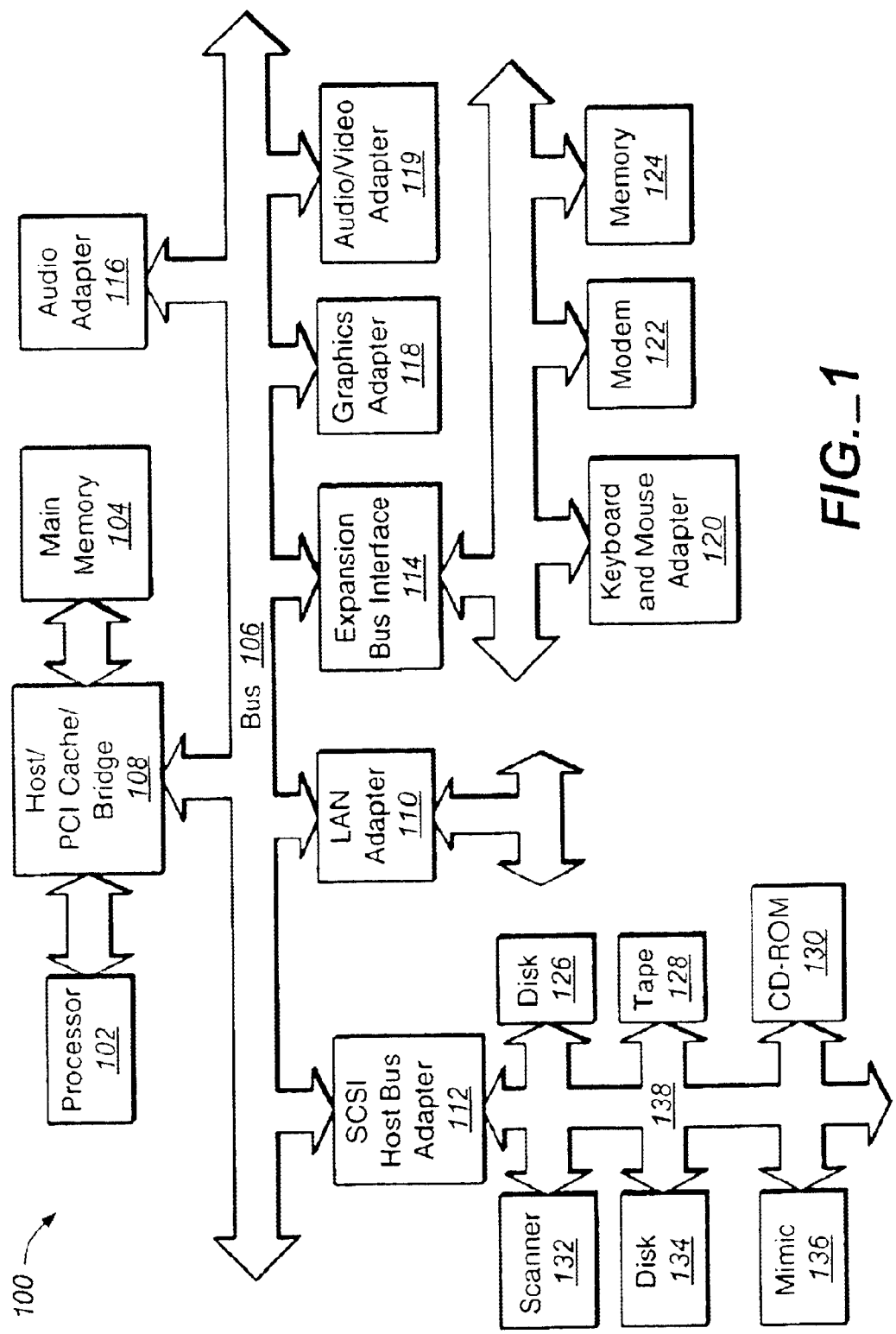
FIG. 1 is a block diagram of a data processing system in which the present invention may be implemented.

With reference now to the figures, and in particular with reference to FIG. 1, a block diagram of a data processing system 100 in which the present invention may be implemented is illustrated. Data processing system 100 employs a peripheral component interconnect (PCI) local bus architecture. Although the depicted example employs a PCI bus, other bus architectures such as Micro Channel and ISA may be used. Processor 102 and main memory 104 are connected to PCI local bus 106 through PCI bridge 108. PCI bridge 108 also may include an integrated memory controller and cache memory for processor 102. Additional connections to PCI local bus 106 may be made through direct component interconnection or through add-in boards. In the depicted example, local area network (LAN) adapter 110, SCSI host bus adapter 112, and expansion bus interface 114 are connected to PCI local bus 106 by direct component connection. In contrast, audio adapter 116, graphics adapter 118, and audio/video adapter (AN) 119 are connected to PCI local bus 106 by add-in boards inserted into expansion slots. Expansion bus interface 114 provides a connection for a keyboard and mouse adapter 120, modem 122, and additional memory 124. SCSI host bus adapter 112 provides a connection devices such as hard disk drive 126, tape drive 128, CD-ROM 130, scanner 132, removable hard disk 134, and mimic device 136 through SCSI bus 138 in the depicted example. Those of ordinary skill in the art will appreciate that the hardware in FIG. 1 may vary. For example, other peripheral devices, such as optical disk drives and the like may be used in addition to or in place of the hardware depicted in FIG. 1. The depicted example is not meant to imply architectural limitations with respect to the present invention.

The present invention provides a method, apparatus, and instructions for emulating a device that has been removed or disconnected from a data processing system. In the depicted example, the functions emulated are those needed to convince the operating system that the device being emulated is present or connected to the data processing system. The depicted example does not provide other functions actually employed to process actual data transfers. Mimic device 136 in depicted example in FIG. 1 is the location of processes for emulating a device. The processes employed by mimic device 136 may be performed using various mechanisms. For example, the processes may be implemented in a state machine, or as instructions for execution by a processor within mimic device 136. Mimic device 136 is employed to emulate or "mimic" a device that has been removed or disconnected from SCSI bus 138. In the depicted example, when a device is "mimicked" or "emulated", the responses provided or signals onto the bus are those sufficient to convince the operating system that the device being mimicked or emulated is present in the data processing system. Actual input/output functions are not provided as part of the mimicking or emulation of the device in these examples. Each of the devices connected to SCSI bus 138 is assigned an identification (ID). Eight distinct phases are present in SCSI buses: A bus free phase, an arbitration phase, a selection phase, a reselection phase, a command phase, a data phase, a status phase, and a message phase. During the selection phase an ID will be placed onto SCSI bus 138 identify the device that is to be the target in an operation. The target of an operation is a device that responds to a request to perform an operation. An initiator is a device that initiates an operation. Mimic device 136 in the depicted example, stores an ID for each device that mimic device 136 is to emulate or mimic. If mimic device 136 detects an ID for a device that mimic device 136 is to emulate, it will then wait to see if the device responds within a selected period of time. If the device does not respond within the selected period of time, mimic device 136 returns responses to emulate the device. In particular, mimic device 136 in the depicted example, is employed to convince the operating system that the mimicked device is actually present on SCSI bus 138.

This emulation or "mimicking" of a device that is absent is useful in solving the problem in which an operating system requires a SCSI device to be attached to the SCSI bus and powered up at boot time for later use. During boot up, the operating system sends devices an inquiry command, which requests that a SCSI device identified itself and its characteristics. This information is pre-stored within mimic device 136 and returned by mimic device 136 in response to the inquiry command when the device to be emulated or mimicked is absent, not powered up, or disconnected from SCSI bus 138. Other commands such as data transfer requests, results in mimic device 136 returning an error in the depicted example.

During the SCSI selection phase, an initiating device sends out an ID for a target device and waits for up to 250 milliseconds for the target device to assert a busy signal. This busy signal is a signal that indicates the presence of the target device and the target device's ability to proceed with the protocol. Modern SCSI devices typically respond to the selection phase within several milliseconds. If mimic device 136 does not detect assertion of a busy signal for some portion of the 250 millisecond time period, mimic device 136, then senses that the device it is to mimic is absent or not powered up. Once mimic device 136 determines that the device it is to mimic is absent, mimic device 136 will assert a busy signal and continue protocol interactions with the initiator.

Figure 2:
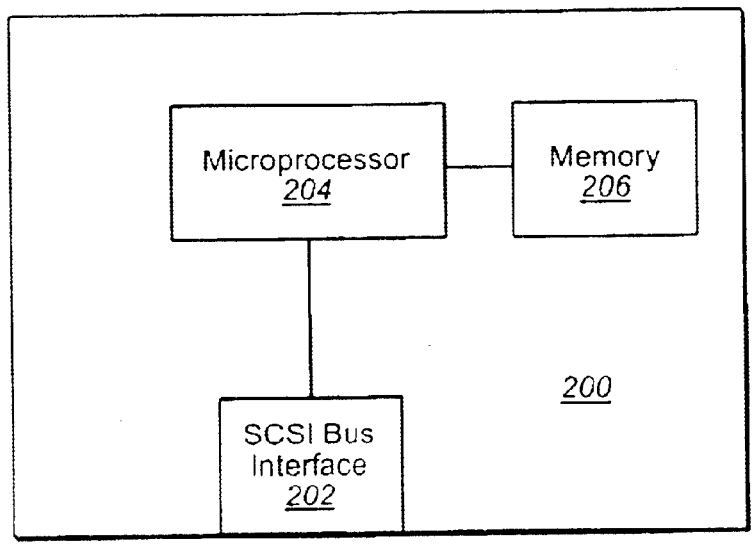
FIG. 2 is a logic block diagram of a mimic device in accordance with a preferred embodiment of the present invention.

Turning next to FIG. 2, a logic block diagram of a mimic device is depicted in accordance with a preferred embodiment of the present invention. Mimic device 200 includes a SCSI bus interface 202, which provides communication to a SCSI bus. In addition, mimic device 200 also includes microprocessor 204 and associated memory 206. SCSI bus interface 202 provides the interface to the SCSI bus for mimic device 200. Microprocessor 204 processes instructions stored within memory 206. In addition, data, such as IDs for devices to be identified and data to be sent in while emulating a device, are stored within memory 206. These components in FIG. 2 are implemented within a single chip in accordance with a preferred embodiment of the present invention.

Figure 3:
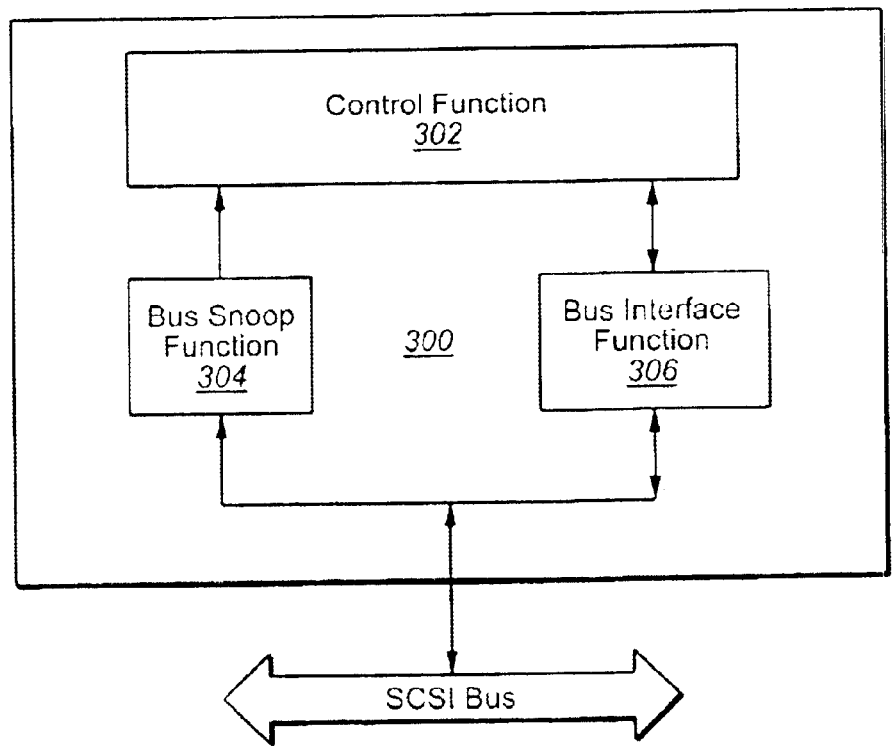
FIG. 3 is a functional block diagram of a mimic device in accordance with a preferred embodiment of the present invention.

With reference now to FIG. 3, a functional block diagram of a mimic device is depicted in accordance with a preferred embodiment of the present invention. Mimic device 300 includes a control function 302, a bus snoop function 304, and a bus interface function 306. In the depicted example, bus snoop function 304 and bus interface function 306 both are located within SCSI interface 202 in FIG. 2. These two functions may be implement in circuitry located in SCSI bus interface 202. Control function 302 is implemented within microprocessor 204 and memory 206 in which microprocessor 204 executes instructions stored within memory 206. Although: in the depicted example, the control function, the bus snoop function, and the bus interface function are shown as separate blocks, these functions may be implemented in a single microprocessor core depending upon the implementation.

Figure 4:
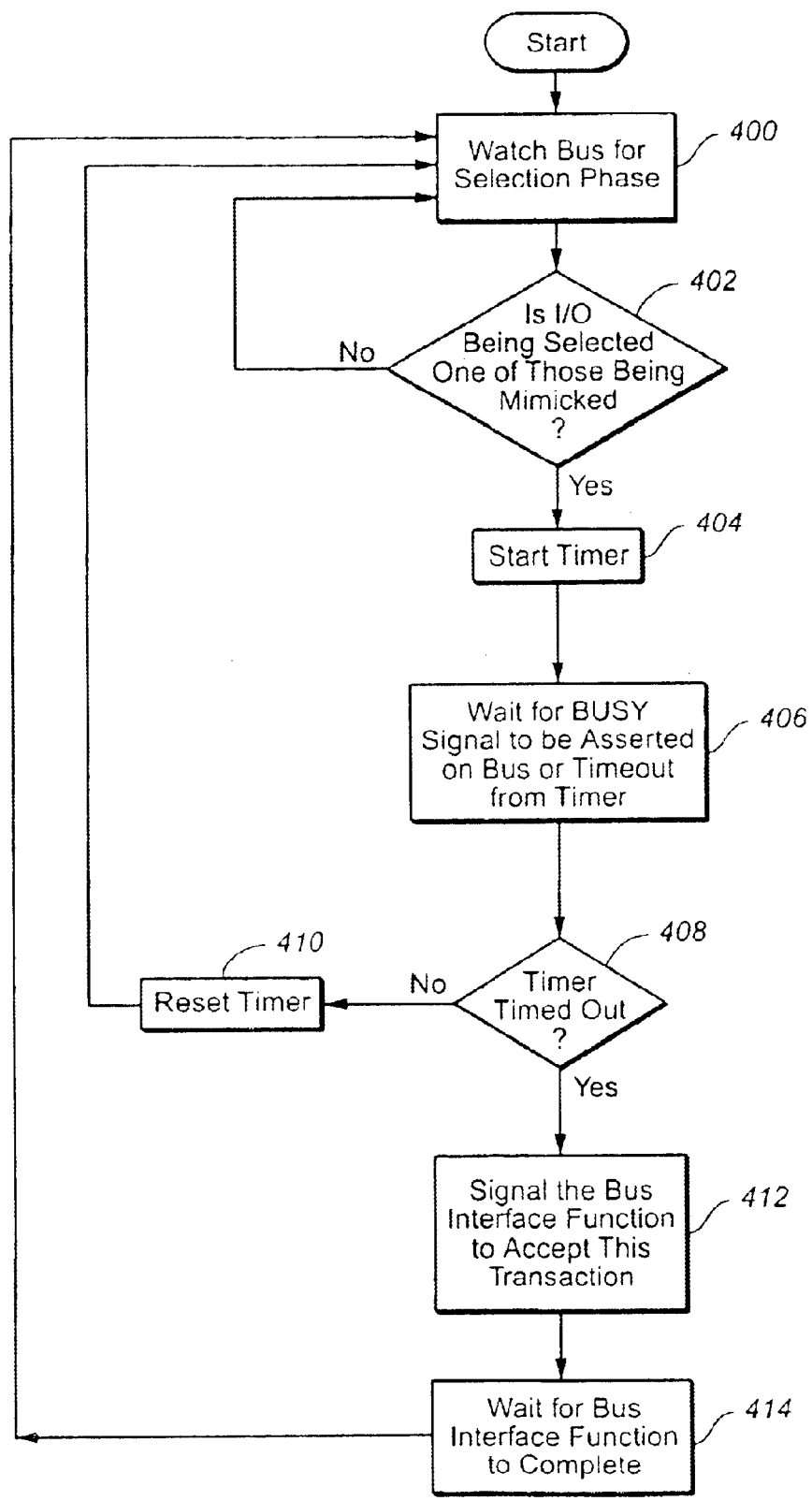
FIG. 4 is a flowchart of a process employed in a bus snoop function in accordance with a preferred embodiment of the present invention.

Turning now to FIG. 4, a flowchart of a process employed in a bus snoop function is depicted in accordance with a preferred embodiment of the present invention. The process begins by watching the bus for a selection phase to begin (step 400). During the selection phase, an identification, ED, is sent onto the bus in which the ID identifies the device that is selected for an I/O transaction. A determination is made as to whether the ID is for a device that is to be emulated or mimicked (step 402). If the ID is not for a device that is to be emulated, the process returns to step 400 as described above to wait for another selection phase. On the other hand, if the ID is for a device to be emulated, a timer is started (step 404). The timer is used the bus snoop function to determine whether the device to be emulated will respond within a selected period of time. After the timer has been started, the process waits for an occurrence of one of two events: (1) a busy signal that is asserted on the SCSI bus or (2) a time out from the timer (step 406). After an occurrence on one of the two events, a determination is made as to whether the timer timed out (step 408). If the timer has not timed out, the process for the bus snoop function resets the timer (step 410) and returns to step 400 as described above. In this case, a busy signal has been asserted onto the SCSI bus, meaning that the device is present on the bus and is handling the requested operation. If the timer has timed out, the device that is to be emulated or mimicked is either not present, not powered up, or for some other reason is unable to respond within the selected period of time. At this time, a signal is sent to the bus interface by the bus snoop function to accept the transaction for the device (step 412). The bus snoop function waits for the bus interface function to complete (step 414) with the process then returning to step 400. A more detailed explanation of the bus interface function and the control function is described in FIG. 5 below.

Figure 5:
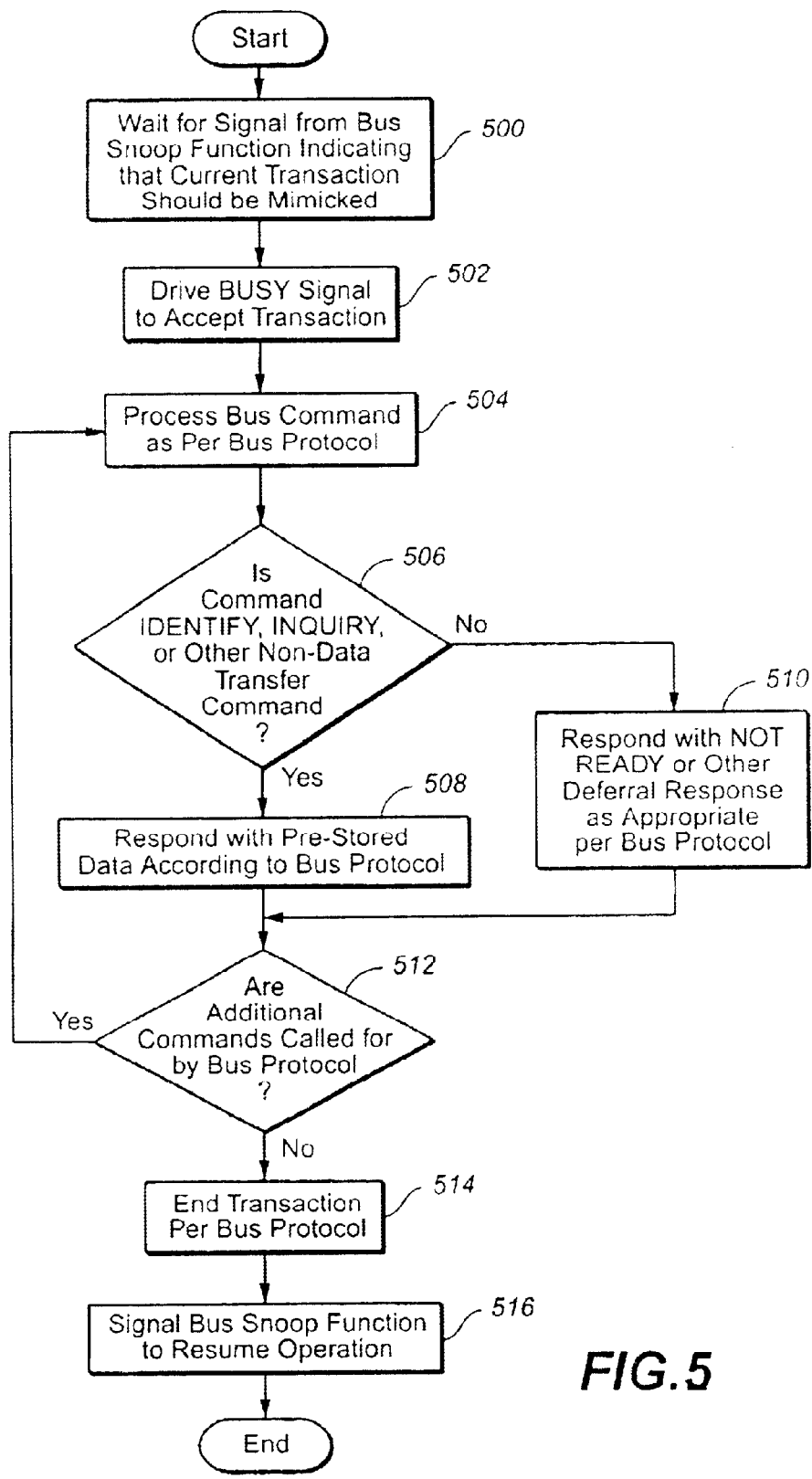
FIG. 5 is a flowchart of a process used in a bus interface and a control function in accordance with a preferred embodiment of the present invention.

Next, with reference to FIG. 5, a flowchart of a process used in a bus interface and control function is illustrated in accordance with a preferred embodiment of the present invention. Process begins on waiting for the signal from the bus function indicating that the current transaction should be emulated or mimicked (step 500). Thereafter, the busy signal is driven onto the SCSI bus to accept the transaction (step 502). Next, the bus command is processed per the bus protocol (step 504). This step is intended to indicate in the depicted example that various bus commands will have different formats (e.g. six byte or ten byte command descriptor blocks (CDBs)) and that the mimick device accepts them according to the bus protocol. Then, the various bus commands are analyzed in order that a determination is made as to whether the command is an identity (IDENTITY), inquiry (INQUIRY), or other non-data transfer command (step 506). If the command is an identity, inquiry or other non-data transfer command, the process responds using pre-stored data according to the bus protocol (step 508). Otherwise, the process responds with a not ready signal (NOT_READY) or other deferral response as appropriate per the bus protocol (step 510). Afterwards, the process in either event proceeds to determine whether additional bus commands are present for processing (step 512). If additional commands are present for processing, the process then returns to step 512 to process the bus command. Otherwise, the process signals the snoop bus function to resume operation in step 414 in FIG. 4. If additional commands are not called for by the bus protocol, the process then ends the transaction per the bus protocol (step 514). Next, the bus snoop function is sent a signal to resume operation (step 516) with the process terminating thereafter.

A mimic device may be externally programmed with the data needed to respond to commands for an emulated device. Alternatively, the mimic device may snoop the SCSI bus for the presence of the device to obtain the needed data.

Figure 6:
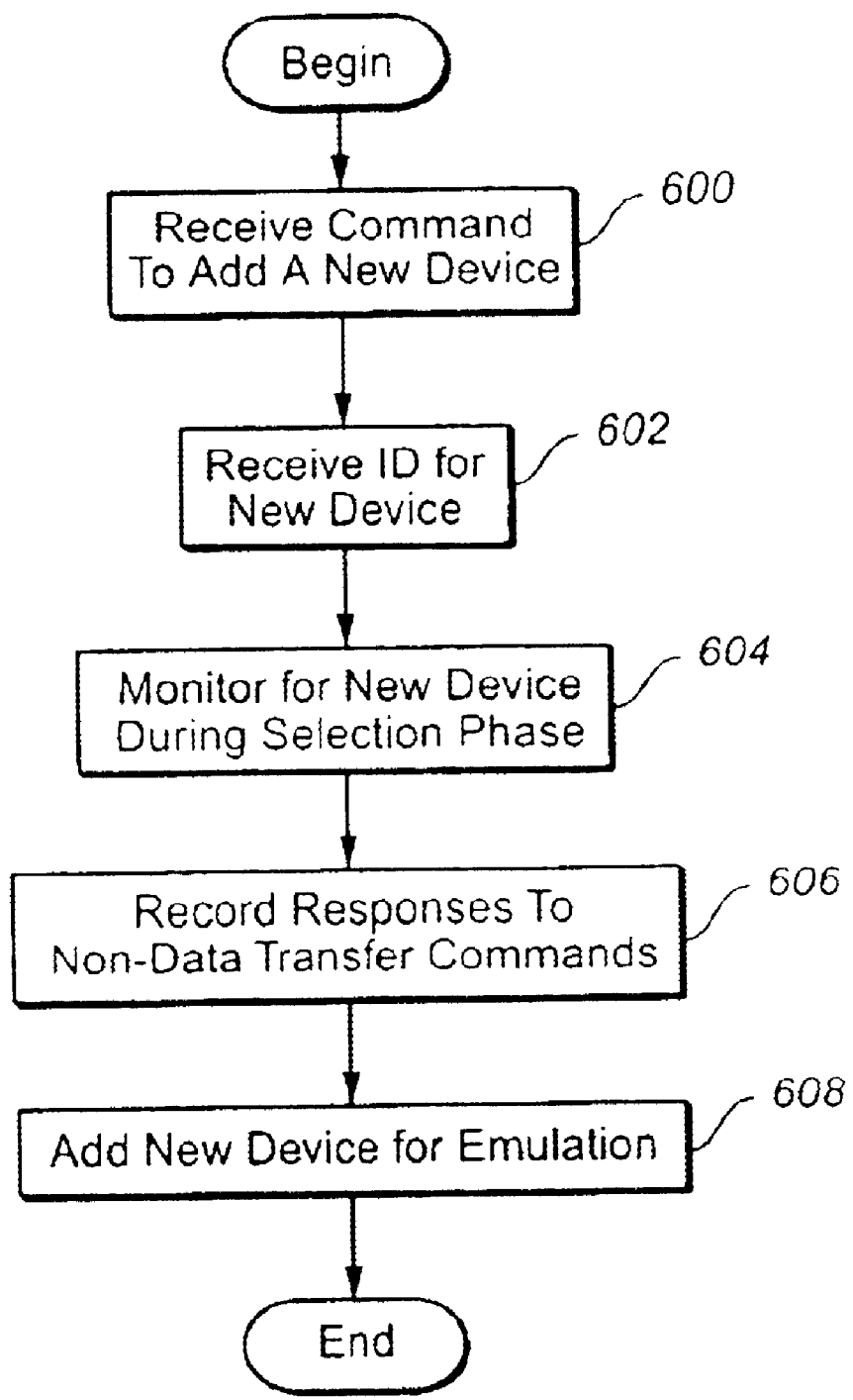
FIG. 6 is a flowchart of a process for adding a device for emulation or mimicking in accordance with a preferred embodiment of the present invention.

With reference now to FIG. 6, a flowchart of a process for adding a device for emulation or mimicking is depicted in accordance with a preferred embodiment of the present invention. The process begins by receiving a command to add a new device (step 600). Thereafter, the ID for the new device is received (step 602), and the ID is stored (step 604). Thereafter, the process monitors for the ID on the SCSI bus each time a selection phase occurs (step 606). When the ID is detected during a selection phase, responses to non-data transfer commands are recorded and stored (step 608). After the data has been recorded, the new device is added as a device that is to be emulated or mimicked (step 610).

Thus, the present invention provides an improved method and apparatus for emulating or mimicking a device within a data processing system. The present invention provides this advantage through monitoring a bus on which the device is normally connected and emulates or mimicks the device in response to detecting an absence of a response from the device after a selected period of time. In the manner, an operating system may be convinced that the device is present, resulting in decreased disruption for uses of a data processing system and decreasing time needed to swap devices.

It is important to note that while the present invention has been described in the context of a fully functioning data processing system, those of ordinary skill in the art will appreciate that the processes of the present invention are capable of being distributed in a form of a computer readable medium of instructions and a variety of forms and that the present invention applies equally regardless of the particular type of signal bearing media actually used to carry out the distribution. Examples of computer readable media include: recordable-type media such a floppy discs and CD-ROMs and transmission-type media such as digital and analog communications links.

The description of the present invention has been presented for purposes of illustration and description, but is not limited to be exhaustive or limited to the invention in the form disclosed. Many modifications and variations will be apparent to those of ordinary skill in the art. The embodiment was chosen and described in order to best explain the principles of the invention the practical application and to enable others of ordinary skill in the art to understand the invention for various embodiments with various modifications as are suited to the particular use contemplated. For example, the emulation function provided by the present invention may be employed without depending on the time out value of the timer to provide increased response speed or to handle devices, which normally take a long time to respond in the selection phase. While the invention has been particularly shown and described with reference to a preferred embodiment, it will be understood by those skilled in the art that various changes in form and detail may be made therein without departing from the spirit and scope of the invention.

What is claimed is:

1. A data processing system comprising:

a bus;

a plurality of devices connected to the bus; and a mimic device connected to the bus, wherein the mimic device monitors the bus for a signal selecting a selected device within the plurality of devices for an input/output transaction during initialization of an operating system within the data processing system, monitors the bus for a response by the selected device in response to detecting the signal selecting the device, and sends a response to the signal a selected period of time passes without a response being made by the selected device, wherein the response indicates to the operating system that the selected device is present within the data processing system.

2. The method of claim 1, wherein the bus is a small computer system interface bus.

3. The method of claim 2, wherein the signal is a busy signal.

4. A data processing system comprising:

a bus;

a plurality of devices attached to the bus; and a mimic device attached to the bus, wherein the mimic device has a plurality of modes of operation including:

a first mode of operation in which the mimic device monitors the bus for a request to a selected device within the plurality of devices;

a second mode of operation, responsive to detecting the request, in which the mimic device monitors the bus for a response from the selected device; and a third mode of operation, responsive to an absence of a response from the selected device within a period of time, in which the mimic device sends a mimicked response to the request onto the bus.

5. The data processing system of claim 4, wherein the mimicked response includes sending a busy signal onto the bus.

6. The data processing system of claim 5, wherein the mimicked response includes sending a second signal onto the bus.

7. The data processing system of claim 4, wherein the mimicked response includes sending a not ready signal onto the bus.

8. The data processing system claim 4, wherein the bus is a small computer system interface bus.

* * * * *